(12) United States Patent
Grebnov et al.

(10) Patent No.: US 10,943,191 B2
(45) Date of Patent: *Mar. 9, 2021

(54) DESIGNER TOOL FOR MANAGING CLOUD COMPUTING SERVICES

(71) Applicant: Microsoft Technology Licensing, LLC, Redmond, WA (US)

(72) Inventors: Ilya Grebnov, Kirkland, WA (US); Charles Lamanna, Bellevue, WA (US); Stephen Siciliano, Bellevue, WA (US); Balasubramanian Shyamsundar, Redmond, WA (US); Prabir Shrestha, Redmond, WA (US); Kevin Lam, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/541,424

(22) Filed: Aug. 15, 2019

(65) Prior Publication Data

US 2020/0050981 A1 Feb. 13, 2020

Related U.S. Application Data

(63) Continuation of application No. 15/821,935, filed on Nov. 24, 2017, now Pat. No. 10,430,735, which is a (Continued)

(51) Int. Cl.
*G06F 9/50* (2006.01)
*G06F 8/34* (2018.01)
*G06Q 10/06* (2012.01)

(52) U.S. Cl.
CPC ............... *G06Q 10/06* (2013.01); *G06F 8/34* (2013.01); *G06F 9/5038* (2013.01); *G06F 9/5072* (2013.01)

(58) Field of Classification Search
None
See application file for complete search history.

(56) References Cited

U.S. PATENT DOCUMENTS

2010/0070464 A1* 3/2010 Aymeloglu ........... G06F 3/0482
707/608
2012/0215583 A1* 8/2012 Kunti ..................... G06Q 10/06
705/7.27

(Continued)

*Primary Examiner* — Daxin Wu
(74) *Attorney, Agent, or Firm* — Liang IP, PLLC

(57) ABSTRACT

Embodiments of facilitating creation of cloud computing applications are disclosed therein. In one embodiment, a method includes receiving user input of a plurality of workflow items as a sequence of graphical objects on a graphical user interface. The workflow items individually are related to one or more cloud computing services. The method also includes determining an execution sequence of the plurality of workflow items based on data dependencies individually between pairs of the workflow items, the determined execution sequence being different than the sequence of the graphical objects. The determined execution sequence includes executing pairs of the workflow items without data dependencies therebetween generally in parallel and sequentially executing other pairs of the workflow items with data dependencies therebetween in accordance with the data dependencies.

20 Claims, 9 Drawing Sheets

Related U.S. Application Data continuation of application No. 15/083,170, filed on Mar. 28, 2016, now Pat. No. 9,858,045.

(56) References Cited

U.S. PATENT DOCUMENTS

| | | | |
|---|---|---|---|
| 2014/0075027 A1* | 3/2014 | Chatterjee | H04L 41/5041 709/225 |
| 2015/0205790 A1* | 7/2015 | Ikejima | G06F 16/93 707/608 |
| 2015/0339268 A1* | 11/2015 | Bednarz, Jr. | G06F 40/14 715/248 |
| 2016/0103706 A1* | 4/2016 | Novaes | G06Q 10/10 718/102 |
| 2016/0232034 A1* | 8/2016 | Blanchflower | G06F 9/505 |
| 2016/0259655 A1* | 9/2016 | Nychis | G06F 9/4488 |
| 2017/0031565 A1* | 2/2017 | Chauhan | G06F 3/04842 |

* cited by examiner

DESIGNER TOOL FOR MANAGING CLOUD COMPUTING SERVICES

CROSS-REFERENCE TO RELATED APPLICATION(S)

This application is a continuation of and claims priority to U.S. patent application Ser. No. 15/821,935, filed Nov. 24, 2017, which is a continuation of and claims priority to U.S. patent application Ser. No. 15/083,170, filed on Mar. 28, 2016, now U.S. Pat. No. 9,858,045, issued Jan. 2, 2018, the disclosure of which is incorporated herein in its entirety.

BACKGROUND

Remote or "cloud" computing typically utilizes a collection of virtual machines or other remote servers, rather than local servers or personal computers, to process, manage, or store user data. A communications network can interconnect the remote servers as nodes to form a computing fabric. During operation, one or more nodes of the computing fabric can cooperate with one another to provide a distributed computing environment that facilitates execution of various software applications to provide various cloud services.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Remote computing can offer a wide variety of cloud services to users. For example, a user can utilize a hosted email service for emails, appointments, reminders, tasks, and other items. Cloud computing can also allow users to create customized applications or "apps" that manage, control, or otherwise interact with various computing and/or communications platforms or services. For instance, a user can create an app configured to send a notification email to the user (or other users) when a keyword (e.g., "Azure") has been tweeted more than a number of times on Twitter®.

In conventional systems, creating such apps often involves users with certain levels of computing programming skills, such as Java Scripting, and knowledge of application programming interfaces ("APIs") of various computing/communications platforms, such as Twitter®. As such, creating such apps can be difficult for a large number of users without such skills or knowledge. Several embodiments of the disclosed technology can allow easy and efficient creation of such apps by providing a designer tool based on graphical object oriented programming. In certain embodiments, a user can configure triggers, conditions, actions, or other suitable workflow items using graphical objects. The designer tool can then automatically convert or "translate" the graphical objects into, for example, program codes in JavaScript Object Notation ("JSON") or other suitable programming notations. The designer tool can also allow the user to specify and/or modify data dependency of various graphic objects and then automatically determine or adjust an execution sequence of the app without requiring additional input from the user.

DETAILED DESCRIPTION

Figure 1:
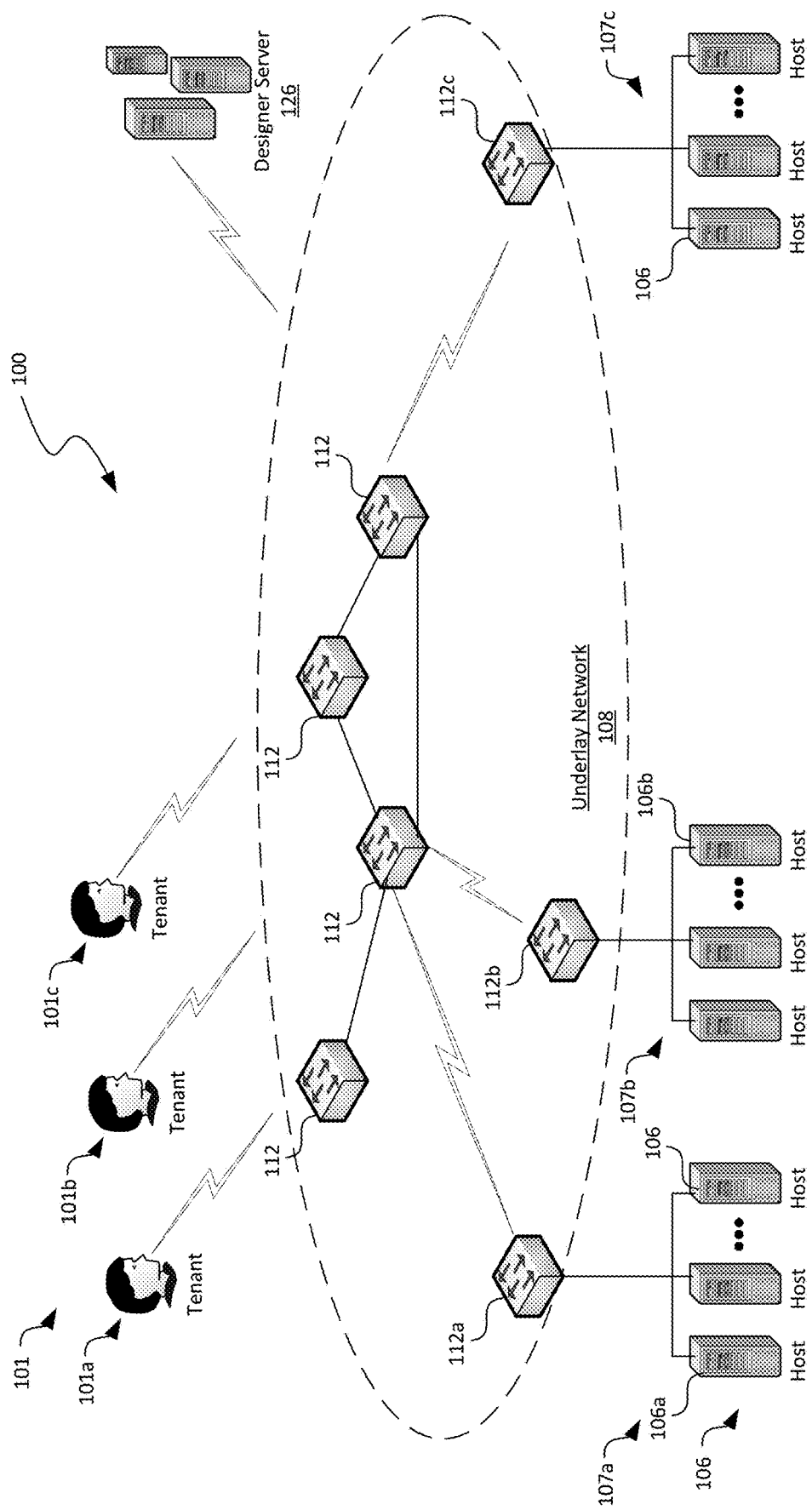
FIG. 1 is a schematic diagram illustrating a computing system configured to provide cloud services in accordance with embodiments of the disclosed technology.

Various embodiments of computing systems, devices, components, modules, routines, and processes related to designer tools for facilitating creation or modification of cloud computing applications are described below. In the following description, example software codes, values, and other specific details are included to provide a thorough understanding of various embodiments of the present technology. A person skilled in the relevant art will also understand that the technology may have additional embodiments. The technology may also be practiced without several of the details of the embodiments described below with reference to FIGS. 1-6.

As used herein, the term "computing system" generally refers to an interconnected computer network having a plurality of network nodes that connect a plurality of servers or hosts to one another or to external networks (e.g., the Internet). One example of a computing system is a cloud computing datacenter configured to provide certain cloud services. The term "network node" generally refers to a physical network device. Example network nodes include routers, switches, hubs, bridges, load balancers, security gateways, or firewalls. A "host" generally refers to a physical computing device configured to implement, for instance, one or more virtualized computing devices or components, or other suitable functionalities. For example, a host can include a server having a hypervisor configured to support one or more virtual machines or other suitable virtual components.

A computing network can be conceptually divided into an overlay network implemented over an underlay network. An "overlay network" generally refers to an abstracted network implemented over and operating on top of an underlay network. The underlay network can include multiple physical network nodes interconnected with one another. An overlay network can include one or more virtual networks. A "virtual network" generally refers to an abstraction of a portion of the underlay network in the overlay network. A virtual network can include one or more virtual end points referred to as "tenant sites" individually used by a user or "tenant" to access the virtual network and associated computing, storage, or other suitable resources. A tenant site can host one or more tenant end points ("TEPs"), for example, virtual machines. The virtual networks can interconnect multiple TEPs on different hosts. Virtual network nodes in the overlay network can be connected to one another by virtual links individually corresponding to one or more network routes along one or more physical network nodes in the underlay network.

In conventional computing systems, creating cloud service apps can have requisite levels of computer programming skills and/or knowledges. As such, creating such apps can be difficult for a large number of users without such skills or knowledges. Several embodiments of the disclosed technology can allow a user to easily and efficiently create or modify such apps by providing a designer tool based on graphical object oriented programming. As discussed in more detail below, embodiments of the designer tool can provide graphical objects for triggers, conditions, actions, or other suitable types of workflow items. The designer tool can then automatically convert or "translate" the graphical objects into, for example, JSON codes or other suitable programming languages. As such, the user can create apps even without knowledge of programming syntax or APIs of various computing/communications platforms. Additional embodiments of the disclosed technology are described in more detail below with reference to FIGS. 1-6.

FIG. 1 is a schematic diagram illustrating a computing system 100 configured to provide cloud services in accordance with embodiments of the disclosed technology. As shown in FIG. 1, the computing system 100 can include an underlay network 108 interconnecting a plurality of hosts 106, a plurality of tenants 101, and a designer server 126. Even though particular components of the computing system 100 are shown in FIG. 1, in other embodiments, the computing system 100 can also include additional and/or different components. For example, in certain embodiments, the computing system 100 can also include network storage devices, maintenance managers, and/or other suitable components (not shown).

As shown in FIG. 1, the underlay network 108 can include one or more network nodes 112 that interconnect the multiple hosts 106, the tenants 101, and the designer server 126. In certain embodiments, the hosts 106 can be organized into racks, action zones, groups, sets, or other suitable divisions. For example, in the illustrated embodiment, the hosts 106 are grouped into three host sets identified individually as first, second, and third host sets 107a-107c. In the illustrated embodiment, each of the host sets 107a-107c is operatively coupled to a corresponding network nodes 112a-112c, respectively, which are commonly referred to as "top-of-rack" or "TOR" network nodes. The TOR network nodes 112a-112c can then be operatively coupled to additional network nodes 112 to form a computer network in a hierarchical, flat, mesh, or other suitable types of topology that allows communication between hosts 106, the designer server 126, and the tenants 101. In other embodiments, multiple host sets 107a-107c may share a single network node 112.

The hosts 106 can individually be configured to provide computing, storage, and/or other suitable cloud computing services to the tenants 101. For example, as described in more detail below with reference to FIG. 2, one of the hosts 106 can initiate and maintain one or more virtual machines 144 (shown in FIG. 2) upon requests from the tenants 101. The tenants 101 can then utilize the initiated virtual machines 144 to perform computation, communications, and/or other suitable tasks. In certain embodiments, one of the hosts 106 can provide virtual machines 144 for multiple tenants 101. For example, the host 106' can host three virtual machines 144 individually corresponding to each of the tenants 101a-101b.

In accordance with several embodiments of the disclosed technology, the designer server 126 can be configured to provide a designer tool based on graphical object oriented programming for creating, modifying, or managing cloud computing apps. As used herein, the terms "cloud computing apps" or "cloud service apps" generally refer to computer applications designed to be executed by remote computing facilities (e.g., datacenters) and provide services accessible via computer networks (e.g., the Internet). In certain embodiments, the designer server 126 can be a standalone server operatively coupled to the underlay network 108. In other embodiments, the designer server 126 can be implemented as one or more cloud computing services executing on and provided by, for example, one or more of the hosts 106. Example components of the designer server 126 are described in more detail below with reference to FIG. 3.

Figure 2:
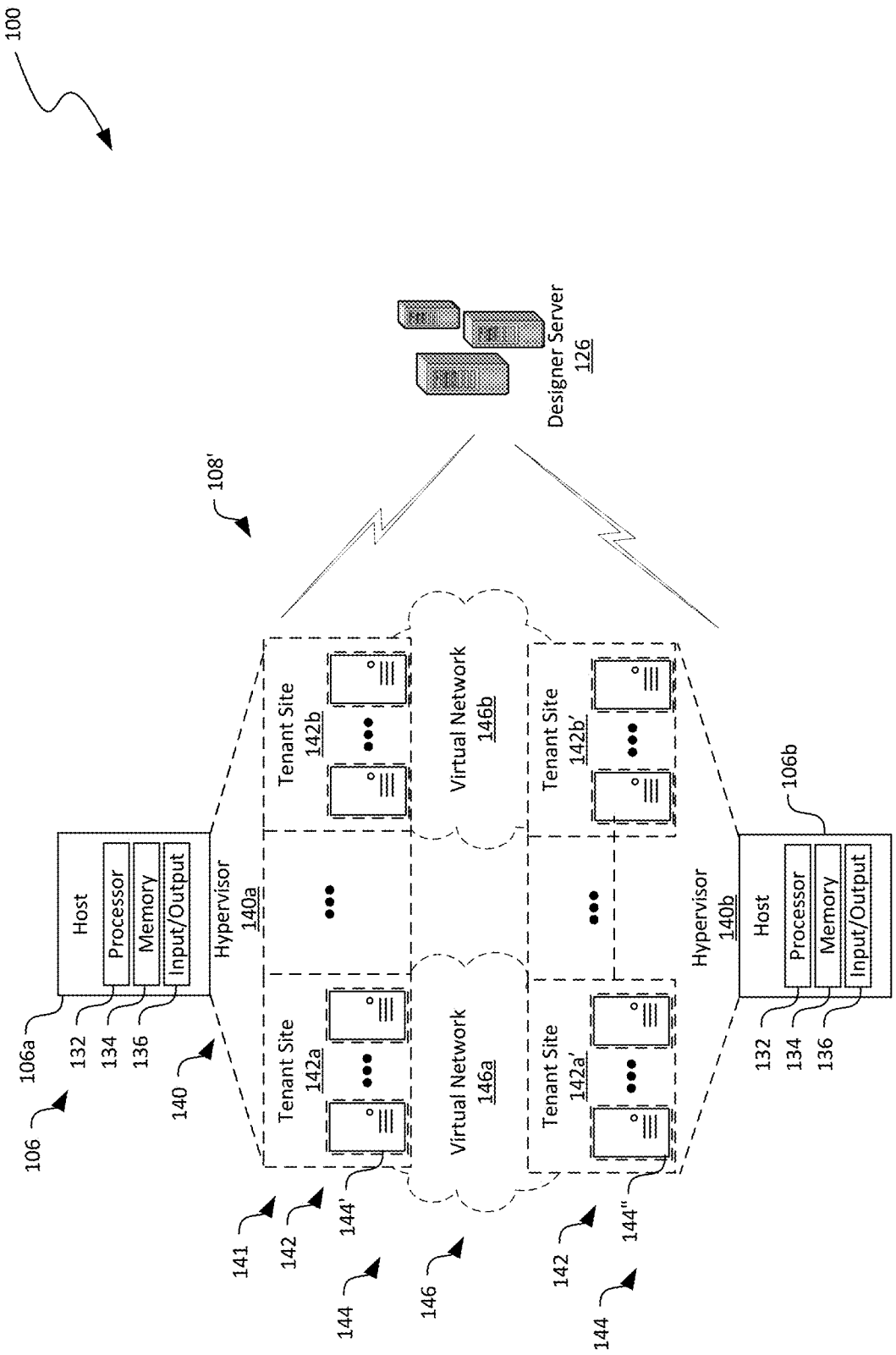
FIG. 2 is a schematic diagram illustrating certain hardware/software components of the computing system of FIG. 1 in accordance with embodiments of the disclosed technology.

FIG. 2 is a schematic diagram illustrating an overlay network 108' implemented on the underlay network 108 of FIG. 1 in accordance with embodiments of the disclosed technology. In FIG. 2, only certain components of the underlay network 108 of FIG. 1 are shown for clarity.

As shown in FIG. 2, the first host 106a and the second host 106b can each include a processor 132, a memory 134, and an input/output component 136 operatively coupled to one another. The processor 132 can include a microprocessor, a field-programmable gate array, and/or other suitable logic devices. The memory 134 can include volatile and/or nonvolatile media (e.g., ROM; RAM, magnetic disk storage media; optical storage media; flash memory devices, and/or other suitable storage media) and/or other types of computer-readable storage media configured to store data received from, as well as instructions for, the processor 132 (e.g., instructions for performing the methods discussed below with reference to FIG. 5). The input/output component 136 can include a display, a touch screen, a keyboard, a mouse, a printer, and/or other suitable types of input/output devices configured to accept input from and provide output to an operator and/or an automated software controller (not shown).

The memory 134 of the first and second hosts 106a and 106b can contain instructions executable by the processors 132 to cause the individual processors 132 to provide a hypervisor 140 (identified individually as first and second hypervisors 140a and 140b) and other suitable components (not shown). The hypervisors 140 can individually be configured to generate, monitor, terminate, and/or otherwise manage one or more virtual machines 144 organized into tenant sites 142. For example, as shown in FIG. 2, the first host 106a can provide a first hypervisor 140a that manages first and second tenant sites 142a and 142b, respectively. The second host 106b can provide a second hypervisor 140b that manages first and second tenant sites 142a' and 142b', respectively. The hypervisors 140 can be software, firmware, or hardware components. The tenant sites 142 can each include multiple virtual machines 144 for a particular tenant (not shown). For example, the first host 106a and the second host 106b can both host the tenant site 142a and 142a' for a first tenant 101a (FIG. 1). The first host 106a and the second host 106b can both host the tenant site 142b and 142b' for a second tenant 101b (FIG. 1). Each virtual machine 144 can be executing a corresponding operating system, middleware, and/or applications.

Also shown in FIG. 2, the computing system 100 can include an overlay network 108' having one or more virtual networks 146 that interconnect the tenant sites 142a and 142b across multiple hosts 106. For example, a first virtual network 142a interconnects the first tenant sites 142a and 142a' at the first host 106a and the second host 106b. A second virtual network 146b interconnects the second tenant sites 142b and 142b' at the first host 106a and the second host 106b. Even though a single virtual network 146 is shown as corresponding to one tenant site 142, in other embodiments, multiple virtual networks 146 (not shown) may be configured to correspond to a single tenant site 146.

The virtual machines 144 on the virtual networks 146 can communicate with one another via the underlay network 108 (FIG. 1) even though the virtual machines 144 are located on different hosts 106. Communications of each of the virtual networks 146 can be isolated from other virtual networks 146. In certain embodiments, communications can be allowed to cross from one virtual network 146 to another through a security gateway or otherwise in a controlled fashion. A virtual network address can correspond to one of the virtual machine 144 in a particular virtual network 146. Thus, different virtual networks 146 can use one or more virtual network addresses that are the same. Example virtual network addresses can include IP addresses, MAC addresses, and/or other suitable addresses.

Figure 3:
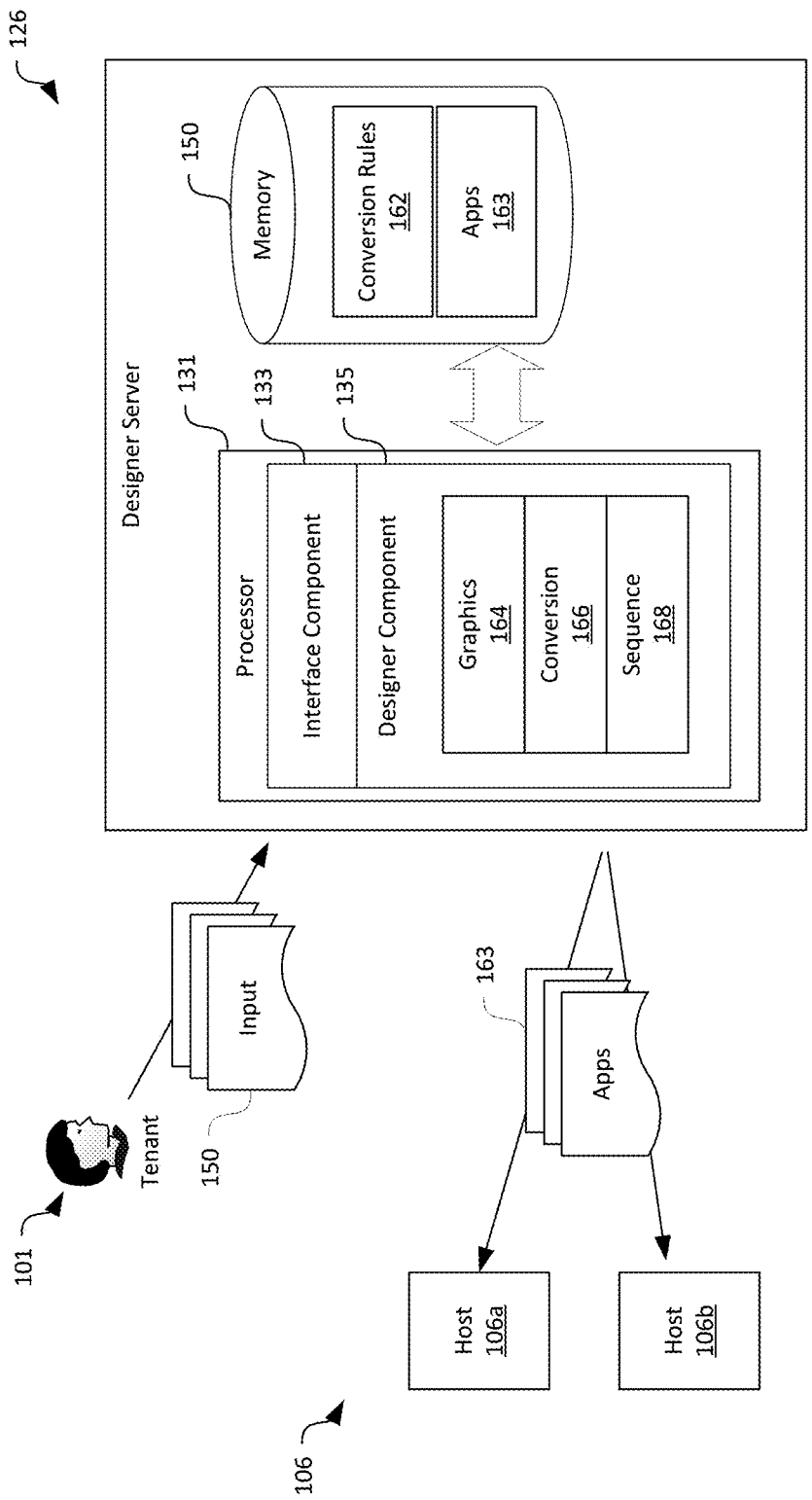
FIG. 3 is a block diagram illustrating hardware/software components of a service controller suitable for the computing system of FIG. 1 in accordance with embodiments of the disclosed technology.

FIG. 3 is a schematic block diagram illustrating certain hardware/software components of the designer server 126 suitable in the computing system 100 shown in FIGS. 1 and 2 in accordance with embodiments of the disclosed technology. In FIG. 3 and in other Figures herein, individual software components, objects, classes, modules, and routines may be a computer program, procedure, or process written as source code in C, C++, C #, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices. Equally, components may include hardware circuitry. A person of ordinary skill in the art would recognize that hardware may be considered fossilized software, and software may be considered liquefied hardware. As just one example, software instructions in a component may be burned to a Programmable Logic Array circuit, or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 3, the designer server 126 can include a processor 131 operatively coupled to a memory 150 containing records of conversion rules 162 and apps 163. The conversion rules 162 can individually contain codes (e.g., JSON codes) and/or templates of codes that correspond to a graphical object provided by the designer tool. For example, the following JSON codes can correspond to a graphic object configured as a trigger:

```
"<name-of-the-trigger>": {
    "type": "<type-of-trigger>",
        "inputs": { <settings-for-the-call> },
        "recurrence": {
        "frequency": "Second|Minute|Hour|Week|Month|Year",
        "interval": "(recurrence interval in units of frequency>"
        },
        "conditions": [ <array-of-required-conditions > ],
        "splitOn": "<property to create runs for>"
    }
```

As shown in the example above, the trigger can include various parameters, for example, name of the trigger, type of the trigger, input parameters, recurrent parameters, conditions, etc. In certain embodiments, the user can specify one or more of the foregoing parameters for the trigger via text boxes, dropdown menus, or other suitable objects on a graphical user interface. In other embodiments, the user can specify one or more of the parameters by directly editing the codes in a text editor or other suitable editing applications. The apps 163 can individually contain records of codes, graphical objects, execution sequences, and/or other suitable information for individual cloud computing apps.

Also shown in FIG. 3, the processor 131 of the designer server 126 can execute instructions to provide various components. For example, as shown in FIG. 3, the processor 131 can provide an interface component 133 operatively coupled to a designer component 135. Even though only particular components are shown in FIG. 3, in further embodiments, the processor 131 can also provide database components, communications components, or other suitable types of components.

The interface component 133 can be configured to receive user input 150 for configuring a cloud computing app either via a graphical user interface or via a programming editor (e.g., a text editor). The interface component 133 can also be configured to provide any created apps 163 to the hosts 106 for execution. In certain embodiments, the interface component 133 can include a network interface driver and associated applications. In other embodiments, the interface component 133 can also include other suitable components.

The designer component 135 can be configured to facilitate creation or modification of cloud computing apps. In the illustrated embodiment shown in FIG. 3, the designer component 135 can include an graphics module 164, a conversion module 166, and a sequence module 168 operatively coupled to one another. The graphics module 164 can be configured to provide a graphical user interface with associated graphical objects to facilitate creation of a cloud computing app. For example, the graphics module 164 can provide various templates of triggers, conditions, actions, or other suitable types of graphical objects. The graphics module 164 can also provide drag and drop functionality of graphical objects from corresponding templates onto a working area in a graphical user interface. The graphics module 164 can further provide a graphical representation of the graphical objects in the working area. In other examples, the graphics module 164 can be configured to provide sizing, shaping, rotating, aligning, and/or other suitable graphical functions.

The conversion module 166 can be configured to convert or "translate" the graphical objects in the working area into JSON or other suitable types of programming codes based on the conversion rules 162 in the memory 150. For example, in one embodiment, the conversion module 166 can convert a trigger graphic object to a section of codes in JSON discussed above with reference to the conversion rules 162. During conversion, the conversion module 166 can also set the various parameters in the codes in JSON based on the user input 150 to the graphical objects or based on default values.

The sequence module 168 can be configured to determine an execution sequence of a cloud computing application based on data dependencies of various graphical objects in the application. As used herein, the term "data dependency" generally refers to a condition under which execution of a second object consumes or depend on certain data of execution results of a first object. For example, the first object can include an action of sending an email to an email address. Data of execution results of the first object can include one or more values of sending successful, sending failed, time stamp when the email is sent, or other suitable parameters. The second object can include another action of sending a simple text message to a mobile phone number when "sending failed" is the value of execution results from the first object. As such, execution of the second object depends upon certain data of execution results from the first object. Thus, the second object is referred to herein as data dependent upon the first object.

In graphical object oriented programming environments, graphical objects of applications are typically executed sequentially from top to bottom in a linear manner. Extensive code revisions are typically necessary to modify the execution sequence due to, for example, changes in data dependency. Thus, flexibility and efficiency of programming such applications can be limited. Several embodiments of the sequence module 168 can address at least some of the foregoing drawbacks by automatically determine a suitable execution sequence based on data dependencies among pairs of graphical objects.

In certain embodiments, the graphics module 164 can be configured to provide certain graphical components (e.g., dropdown menus) for specifying or modifying data dependency between pairs of graphical objects in an application. A user can then specify or modify data dependency by utilizing such graphical components or via directly modifying the codes in a programming editor. The sequence module 168 can then generate an execution sequence for the graphical objects by first determining whether data dependency exist between a pair of graphical objects. In response to determining that data dependency does not exists between the pair of graphical objects, the sequence module 168 can specify that the graphical objects can be executed in parallel or other independently. In response to determining that data dependency does exist between the pair of graphical objects, the sequence module 168 can automatically calculate a suitable execution sequence such that a first graphical object is executed subsequent to a second graphical object whose data of execution results is consumed by the first graphical object. In other embodiments, if a suitable execution sequence cannot be determined (e.g., when data dependencies become circular), the sequence module 168 can also raise an alarm, indicate an error, or provide other suitable indications. An example of automatically determining an execution sequence is discussed in more detail below with reference to FIGS. 4A-4G.

Figure 4A:
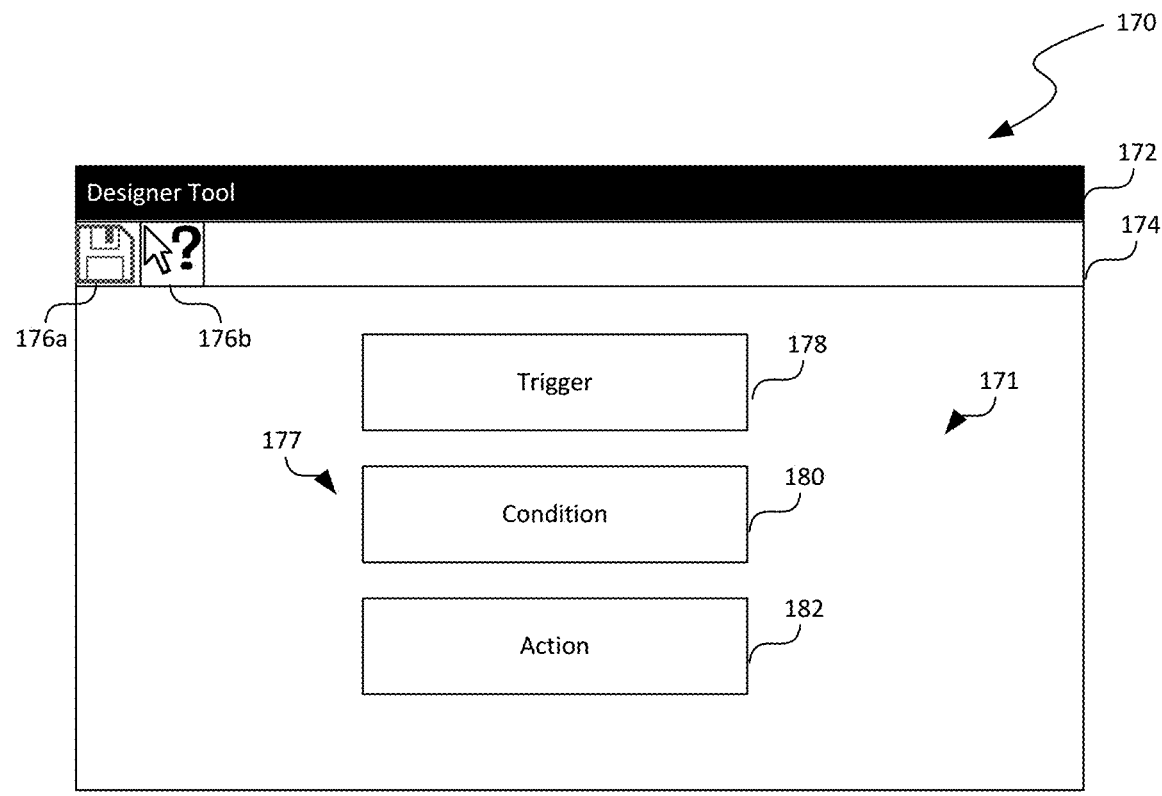
FIGS. 4A-4G are schematic diagrams of a graphical user interface suitable for a designer tool configured in accordance with embodiments of the disclosed technology.

FIGS. 4A-4G are schematic diagrams of a graphical user interface 170 suitable for the designer component 135 in FIG. 3 in accordance with embodiments of the disclosed technology. As shown in FIG. 4A, the graphical user interface 170 can include a title bar 172, a menu bar 174 having various menu icons (e.g., "save" 176a and "help" 176b shown in FIG. 4A for illustration purposes). The graphical user interface 170 can also include a working area 171 in which a user (e.g., the tenant 101 in FIG. 1) can create a cloud computing app using various graphical objects 177 from, for instance, an object template (not shown). In the example shown in FIG. 4A, the graphical objects 177 can include a trigger 178, a condition 180, and an action 182. Examples of each graphical objects 178, 180, and 182 are discussed in more detail below with reference to FIGS. 4B-4D.

Figure 4B:
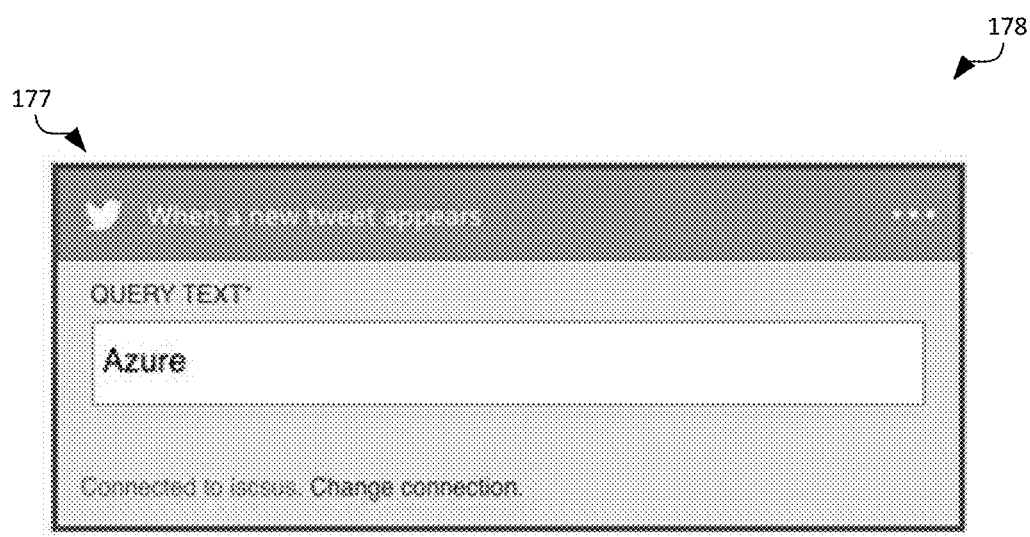

FIG. 4B shows an example suitable for the trigger 178 in FIG. 4A. As used herein, a "trigger" object generally refers to an object for monitoring an event based on certain conditions. For instance, as shown in FIG. 4B, the example trigger 178 can include a defined event for monitoring when a new tweet appears on Twitter® and the new tweet includes the text string "Azure" as shown in the query text box. In other embodiments, the event can include an arrival of an email, occurrence of a calendar event, or other suitable occurrences.

Figure 4C:
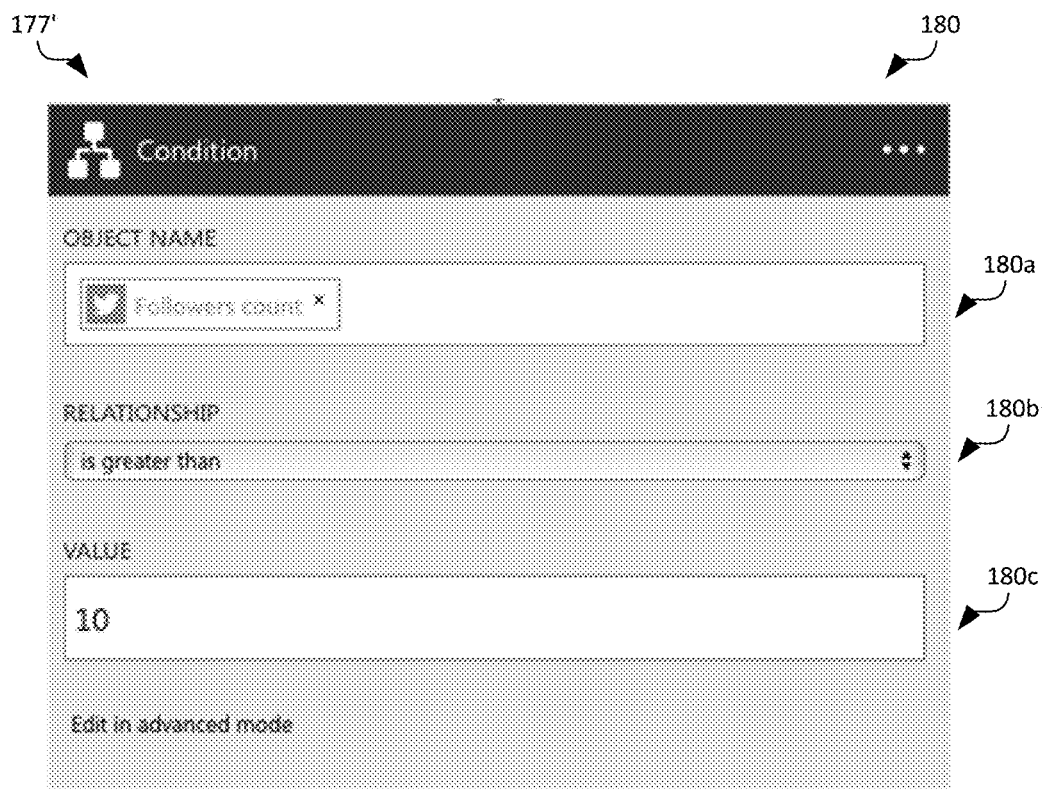

FIG. 4C shows an example suitable for the condition 180 in FIG. 4A. As used herein, a "condition" object generally refers to an object configured to test for certain conditions based on thresholds, occurrences, or other suitable criteria. As shown in FIG. 4C, the example condition 180 can include an object name field 180a (i.e., a Twitter followers count), a relationship filed 180b (i.e., "is greater than"), and a value field 180c (i.e., "10"). Thus, the condition specified in FIG. 4C checks to see whether a new tweet that contains the text string "Azure" has more than ten followers on Twitter®.

Figure 4D:
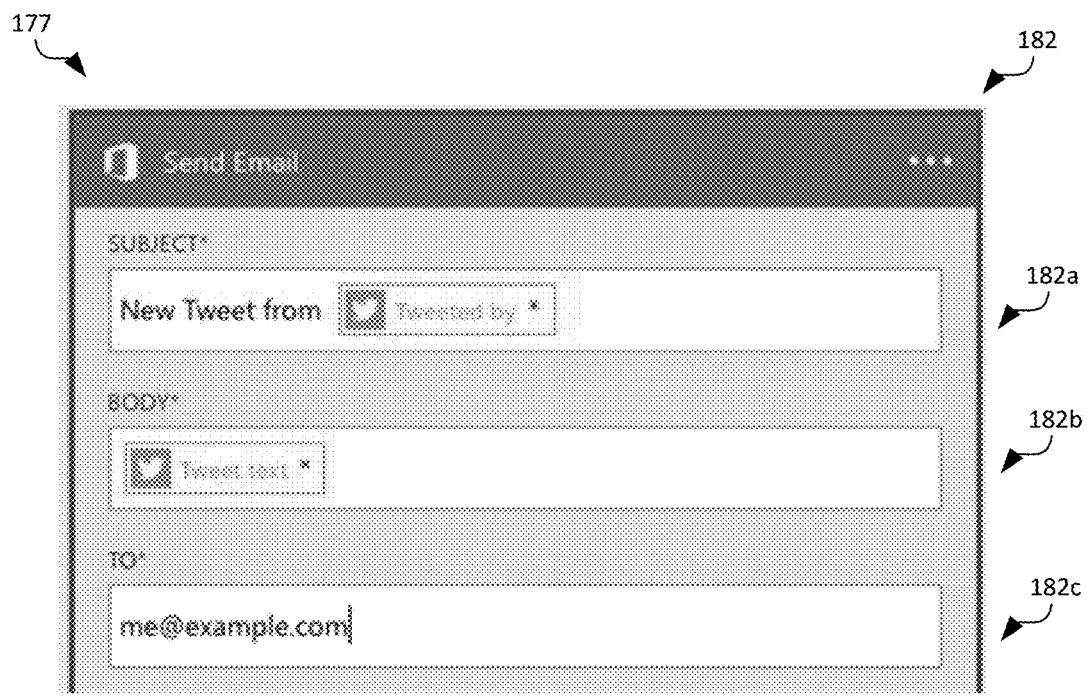

FIG. 4D shows an example suitable for the action 182 in FIG. 4A. As used herein, an "action" object generally refers to an object configured to cause performance of certain functions. For instance, as shown in FIG. 4D, the example action 182 can specify that an email with a subject field 182a having "New Tweet from [source of tweet]," a body with the tweeted text 182b, is to be sent to an email address "me@example.com" 182c.

Figure 4E:
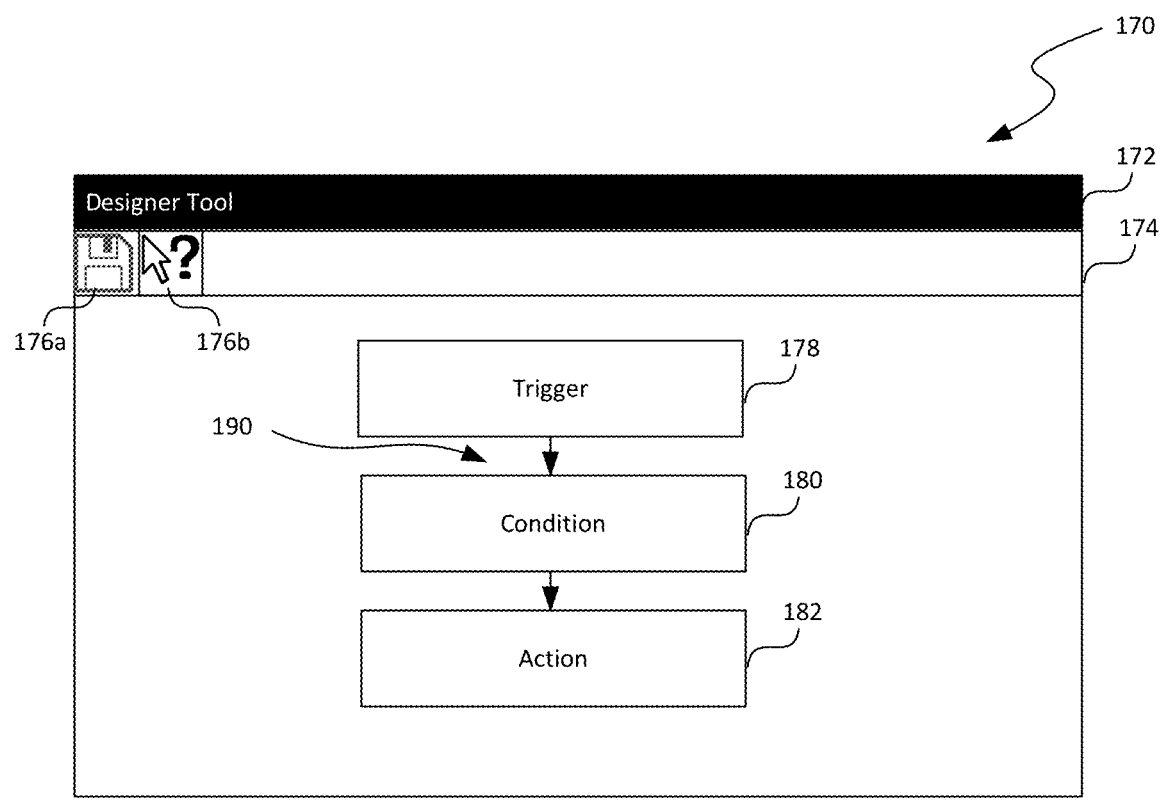

In response to receiving the various graphical objects 177 as shown in FIGS. 4A-4D, the designer component 135 can automatically determine an execution sequence among the various graphical objects 177 and represent the determined execution sequence using, for example, arrows 190 shown in FIG. 4E. For instance, the example condition 180 in FIG. 4C is to be executed after the example trigger 178 in FIG. 4B because the example condition 180 is data dependent (i.e., consumes the Twitter followers count data) from the example trigger 178. Similarly, the example action 182 in FIG. 4D is to be executed after the condition 180 in FIG. 4C because the example action 182 consumes both the "Tweeted by" and "Tweet text" data from the example condition 180. The designer component 135 can also convert the graphical objects 177 into, for example, JSON codes such as those shown above with reference to FIG. 3.

Figure 4F:
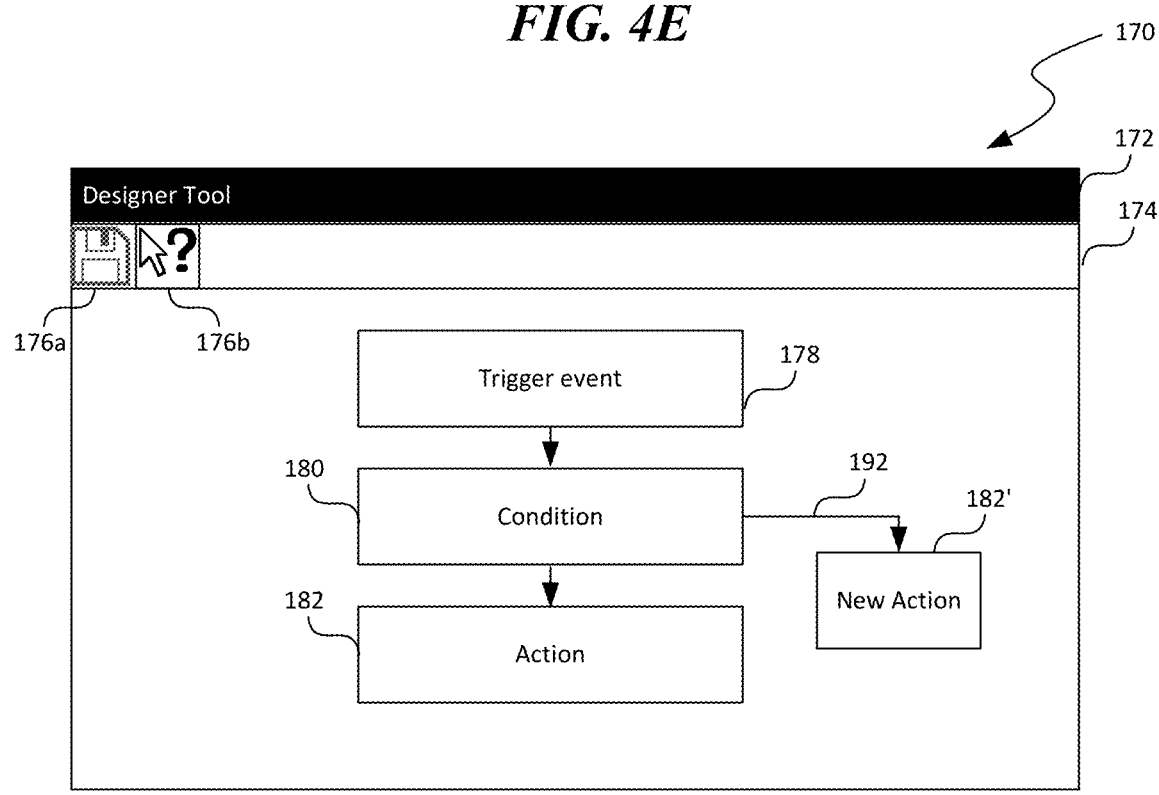
Figure 4G:
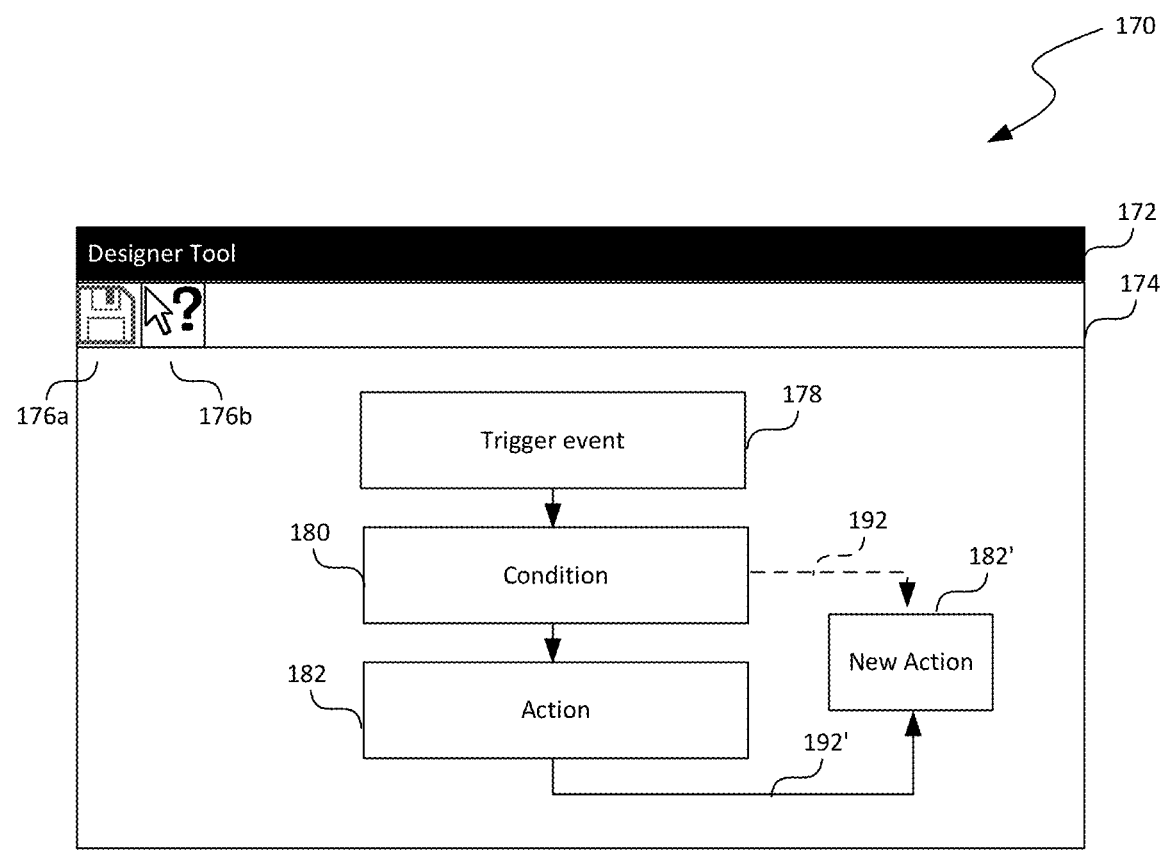

Several embodiments of the designer component 135 can also be configured to flexibly accommodate data dependency modifications as discussed in more detail with reference to FIGS. 4F and 4G. As shown in FIG. 4F, a new action 182' can be added to the graphical objects 177 in the working area 171. In the illustrated embodiment of FIG. 4C, the new action 182' (e.g., sending a text message to a mobile phone number) can be based on the same condition 180 as the existing action 182. Thus, in the example discussed above, a text message can be transmitted to the mobile phone number when a new tweet that contains the text string "Azure" has more than ten followers in addition to the email generated based on the existing action 182. The existing action 182 and the new action 182' can be executed generally concurrently, in parallel, or otherwise independently.

The designer component 135 can then receive a modification of data dependency regarding the existing action 182 and the new action 182'. For example, a user can indicate that the new action 182' (e.g., sending a text message to a mobile phone number) also depends on an execution result (e.g., email send successful, email send failure, etc.) from the existing action 182. In response to the received data dependency change, the designer component 135 can automatically adjust the execution sequence between the existing action 182 and the new action 182' such as the new action 182' is executed after the existing action 182 is executed. As shown in FIG. 4G, the designer component 135 can also graphically represent the adjusted execution sequence with the new arrow 192' and remove the previously represented arrow 192.

Figure 5:
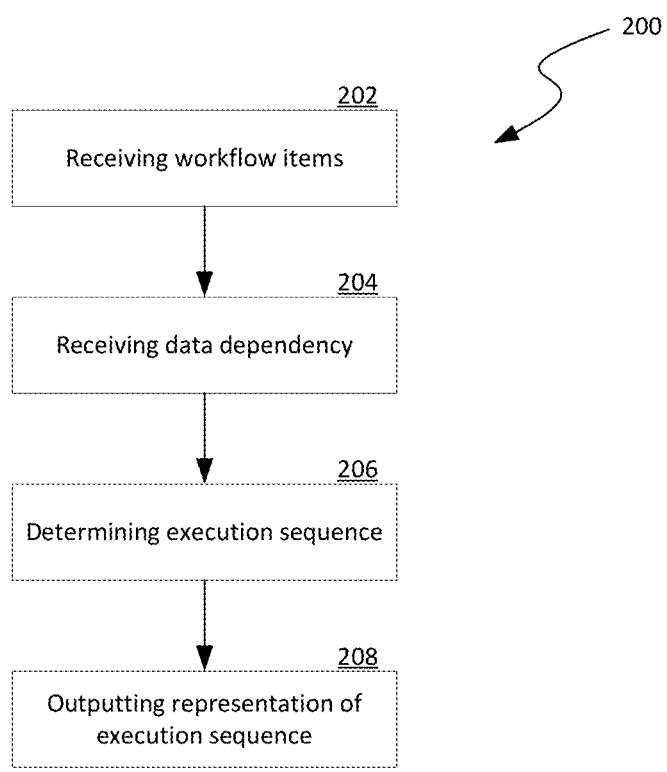
FIG. 5 is a flowchart illustrating a process of facilitating creation and/or modification of a cloud service application in accordance with embodiments of the disclosed technology.

FIG. 5 is a flowchart illustrating a process 200 of facilitating creation and/or modification of a cloud service application in accordance with embodiments of the disclosed technology. As shown in FIG. 5, the process 200 can include receiving workflow items at stage 202. In one embodiment, receiving workflow items can include receiving a plurality of graphical objects individually representing a trigger, a condition, or an action and associated parameters. In another embodiment, receiving workflow items can include receiving codes (e.g., JSON codes) via a text editor. In further embodiments, receiving workflow items can utilize other suitable inputting techniques.

As shown in FIG. 5, the process 200 can also include receiving an indication of data dependency between a pair of the workflow items at stage 204. In one embodiment, the indication can be received as a user selection from a list of available data output associated with one of the workflow items. In other embodiments, the indication can be received as a text string input or other suitable input from a user.

The process 200 can then include automatically determining an execution sequence among the workflow items at stage 206. In certain embodiments, determining an execution sequence can include determining whether data dependency exists between a pair of workflow items. When data dependency does not exist between the pair of workflow items, the determined execution sequence can include sequentially executing the workflow items. When data dependency does exist between the pair of workflow items, the determined execution sequence can include sequentially executing the workflow items based on the data dependency. In other embodiments, the determined execution sequence can include executing certain workflow items in a staggered, interleaved, or other suitable manners. The process 200 can then include outputting a representation of the determined execution sequence, for example, on a graphical user interface at stage 208.

Figure 6:
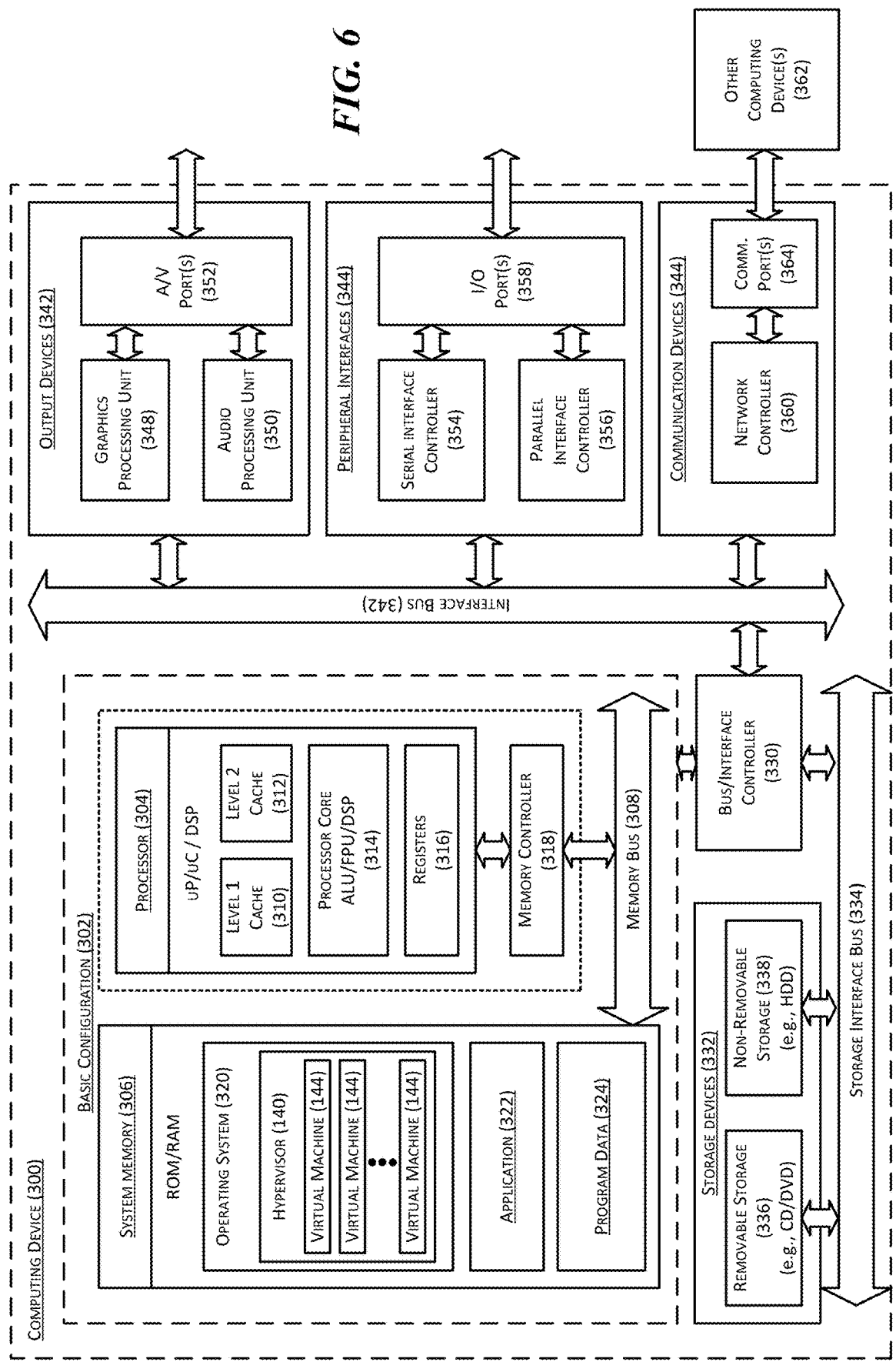
FIG. 6 is a computing device suitable for certain components of the computing network in FIG. 1.

FIG. 6 is a computing device 300 suitable for certain components of the computing system 100 in FIG. 1. For example, the computing device 300 can be suitable for the hosts 106 or the designer server 126 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor ($\mu$P), a microcontroller ($\mu$C), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. As shown in FIG. 6, the operating system 320 can include a hypervisor 140 for managing one or more virtual machines 144. This described basic configuration 302 is illustrated in FIG. 6 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method, comprising:
receiving data describing a workflow having first and second workflow items interconnected to each other and individually related to one or more cloud computing services, wherein the first workflow item is a trigger for monitoring a network event and the second workflow item is a condition of the monitored network event, and wherein the trigger is defined by the received data to, upon execution, initiate a test to determine a presence of the condition in the monitored network event and provide a conditional output indicating the presence of the condition when detected;
determining whether a data dependency exists between the first and second workflow items, wherein a data dependency exists when execution of the second workflow item depends on execution of the first workflow item, or when execution of the first workflow item depends on execution of the second workflow item;
in response to determining that a data dependency exists, translating the first and second workflow items into programming codes in a first execution sequence that allows the first and second workflow items to be executed in accordance with the determined data dependency; and
in response to determining that a data dependency does not exist between the first and second workflow items, translating the first and second workflow items into programming codes in a second execution sequence that allows the first and second workflow items to be executed independently.

2. The method of claim 1 wherein the data dependency specifies consumption by the first workflow item of data generated by execution of the second workflow item, and wherein determining the execution sequence includes determining the execution sequence according to which the first workflow item is executed subsequent to execution of the second workflow item even when the first workflow item is received before the second workflow item.

3. The method of claim 1, further comprising in response to determining that a data dependency exists between the first and second workflow items, outputting a graphical representation of the determined execution sequence on a graphical user interface.

4. The method of claim 1 wherein receiving the data includes receiving data of the first and second workflow items as first and second graphical objects, respectively, in sequence.

5. The method of claim 1 wherein receiving the data includes receiving data of the first and second workflow items as first and second graphical objects, respectively, in sequence, and wherein the method further includes displaying the first and second graphical objects on a user interface.

6. The method of claim 1 wherein:
receiving the data includes receiving data of the first and second workflow items as first and second graphical objects, respectively, in sequence; and
the method further includes rearranging a displayed relationship between the first and second graphical objects on a user interface to conform with the first or second execution sequence.

7. The method of claim 1 wherein receiving the data includes receiving data of the first and second workflow items as first and second graphical objects, respectively, in sequence, and wherein the method further includes converting the received first and second graphical objects into codes of JavaScript Object Notation.

8. The method of claim 1, further comprising:
receiving additional data of a third workflow item having another data dependency from the first workflow item; and
the first execution sequence allows execution of the second workflow item prior to execution of the first workflow item, which proceeds execution of the third workflow item.

9. The method of claim 1 wherein receiving the data includes receiving data of first and second workflow items individually relating to a trigger, a condition, or an action related to one or more cloud computing services.

10. A computing device for facilitating creation of a cloud computing application, the computing device comprising:
a processor;
a memory operatively coupled to the processor, the memory containing instructions executable by the processor to cause the computing device to:
receive data describing a workflow having first and second workflow items individually related to one or more cloud computing services, wherein the first workflow item is a trigger for monitoring a network event and the second workflow item is a condition of the monitored network event, and wherein the trigger is defined by the received data to, upon execution, initiate a test to determine a presence of the condition in the monitored network event and provide a conditional output indicating the presence of the condition when detected;

determine whether a data dependency exists between the first and second workflow items, wherein a data dependency exists when execution of the second workflow item depends on execution of the first workflow item, or when execution of the first workflow item depends on execution of the second workflow item;

in response to determining that a data dependency exists, configure a first execution sequence between the first and second workflow items in accordance with the determined data dependency; and in response to determining that a data dependency does not exist between the first and second workflow items, configure a second execution sequence that allows the first and second workflow items to be executed independently.

11. The computing device of claim 10 wherein the data dependency specifies consumption by the second workflow item of data generated by the first workflow item, and wherein to determine the execution sequence includes to determine the execution sequence according to which the first workflow item is executed before execution of the second workflow item even when the second workflow item is arranged before the first workflow item.

12. The computing device of claim 10 wherein the memory containing additional instructions executable by the processor to cause the computing device to output a graphical representation of the determined execution sequence between the first and second workflow items on a graphical user interface.

13. The computing device of claim 10 wherein the memory containing additional instructions executable by the processor to cause the computing device to receive user input of the first and second workflow items as first and second graphical objects, respectively, in sequence.

14. The computing device of claim 10 wherein the memory containing additional instructions executable by the processor to cause the computing device to receive user input of the first and second workflow items as first and second graphical objects, respectively, in sequence, and to convert the received first and second graphical objects into codes of a programming language.

15. The computing device of claim 10 wherein:
to receive the data includes to receive user input of the first and second workflow items as first and second graphical objects, respectively, in sequence; and
the memory containing additional instructions executable by the processor to cause the computing device to rearrange a displayed relationship between the first and second graphical objects to conform with the determined execution sequence.

16. The computing device of claim 10 wherein to receive the data includes to receive user input of the first and second workflow items as first and second graphical objects, respectively, and the memory containing additional instructions executable by the processor to cause the computing device to convert the received first and second graphical objects into codes of JavaScript Object Notation.

17. The computing device of claim 10 the memory containing additional instructions executable by the processor to cause the computing device to:
receive data describing a third workflow item having a data dependency from the first workflow item; and
determine a third execution sequence that allows execution of the second workflow item to proceed execution of the first workflow item, which proceeds execution of the third workflow item.

18. A method, comprising:
receiving data describing a workflow having first and second workflow items individually related to one or more cloud computing services, wherein the first workflow item is a trigger for monitoring a network event and the second workflow item is a condition of the monitored network event, and wherein the trigger is defined by the received data to, upon execution, initiate a test to determine a presence of the condition in the monitored network event and provide a conditional output indicating the presence of the condition when detected;

when a data dependency exists between the first and second workflow items, configuring a first execution sequence between the first and second workflow items in accordance with the determined data dependency, wherein a data dependency exists when execution of the second workflow item depends on execution of the first workflow item, or when execution of the first workflow item depends on execution of the second workflow item; and when a data dependency does not exist between the first and second workflow items, configuring a second execution sequence that allows the first and second workflow items to be executed independently.

19. The method of claim 18 wherein:
the trigger includes a name of the trigger, a type of the trigger, one or more input parameters of the trigger, one or more recurrent parameters, or one or more criteria of the trigger, execution of the trigger outputting a value indicating whether the one or more criteria of the trigger have been met; and
the condition includes an input parameter and the predetermined threshold, execution of the condition outputting another value indicating whether the input parameter meets the predetermined criterion.

20. The method of claim 18, further comprising:
receiving additional data describing an action configured to cause performance of one or more functions; and
wherein configuring the first execution sequence includes configuring the first execution sequence that allows execution of the action to be subsequent to execution of the condition due to another data dependency from the action to the condition.

* * * * *